(12) United States Patent
Shigekawa et al.

(10) Patent No.: US 10,722,963 B2
(45) Date of Patent: *Jul. 28, 2020

(54) SOLDERING IRON

(71) Applicant: Taiyo Electric Ind. Co., Ltd., Hiroshima-ken (JP)

(72) Inventors: Tomohiro Shigekawa, Fukuyama (JP); Hikaru Mishima, Fukuyama (JP); Kazuhiro Fujimoto, Fukuyama (JP)

(73) Assignee: Taiyo Electric Ind. Co., Ltd., Hiroshima-ken (JP)

( * ) Notice: Subject to any disclaimer, the term of this patent is extended or adjusted under 35 U.S.C. 154(b) by 364 days.

This patent is subject to a terminal disclaimer.

(21) Appl. No.: 15/408,467

(22) Filed: Jan. 18, 2017

(65) Prior Publication Data

US 2017/0368627 A1  Dec. 28, 2017

(30) Foreign Application Priority Data

Jun. 24, 2016  (JP) ................. 2016-125999

(51) Int. Cl.
*B23K 3/03* (2006.01)
*B23K 1/00* (2006.01)

(52) U.S. Cl.
CPC .............. *B23K 3/0338* (2013.01); *B23K 1/00* (2013.01); *B23K 3/033* (2013.01)

(58) Field of Classification Search
CPC .......... B23K 3/02; B23K 3/03; B23K 3/0307; B23K 3/0315; B23K 3/0323; B23K 3/033; B23K 3/0338; B23K 3/0353; B23K 3/0361; B23K 3/0369; B23K 3/0392; B23K 1/00

USPC .......................................... 219/227, 229–339
See application file for complete search history.

(56) References Cited

U.S. PATENT DOCUMENTS

| 3,673,383 | A | * | 6/1972 | Sofia | B23D 79/06 |
| | | | | | 15/236.01 |
| 5,412,178 | A | | 5/1995 | Tamura | |
| 2004/0206740 | A1 | * | 10/2004 | Miyazaki | B23K 3/033 |
| | | | | | 219/229 |

(Continued)

FOREIGN PATENT DOCUMENTS

| CN | 2670043 Y | 1/2005 |
| CN | 201009027 Y | 1/2008 |

(Continued)

OTHER PUBLICATIONS

Chinese Patent Office, Office Action issued in CN 201710055599.2 dated Apr. 1, 2019, 15 pages.

(Continued)

*Primary Examiner* — Ibrahime A Abraham
*Assistant Examiner* — Justin C Dodson
(74) *Attorney, Agent, or Firm* — Wood Herron & Evans LLP

(57) ABSTRACT

A soldering iron including an iron main body; and an iron tip having a leading end configured to fuse solder, the iron tip including an iron tip main body of a thermal conductive material; a heater configured to heat the iron tip main body, and a temperature sensor configured to detect a temperature of the leading end side of the iron tip, wherein, a first hole part accommodating the heater and a second hole part accommodating the temperature sensor are formed independent of each other inside the iron tip main body.

5 Claims, 4 Drawing Sheets

(56) References Cited

U.S. PATENT DOCUMENTS

2008/0010808 A1* 1/2008 Shigekawa .......... B23K 3/0338
                      29/592
2009/0008379 A1* 1/2009 Ingemanson ............ A21B 1/22
                      219/395

FOREIGN PATENT DOCUMENTS

| JP | 58194864 U | 12/1983 |
| JP | 02247078 A | 10/1990 |
| JP | 10339674 A | 12/1998 |
| JP | 2004017060 A | 1/2004 |
| JP | 2007190577 A | 8/2007 |
| JP | 2011000619 A | 1/2011 |
| JP | 2012121043 A | 6/2012 |
| KR | 0133443 B1 | 7/1998 |
| TW | I256331 B | 6/2006 |

OTHER PUBLICATIONS

Japanese Patent Office, Office Action issued in JP2016-125999 dated Mar. 17, 2020, 8 pages.
German Patent Office, Office Action issued in DE 102017100975.2 dated May 13, 2020, 9 pages.

* cited by examiner

SOLDERING IRON

CROSS-REFERENCE TO RELATED APPLICATIONS

Priority is claimed on Japanese Patent Application No. 2016-125999, filed on Jun. 24, 2016, the contents of which are incorporated herein by reference.

BACKGROUND

Field of the Invention

The present invention relates to a soldering iron.

Background

In the related art, an iron tip of a soldering iron is known, in which an iron tip main body of a thermal conductive material with a hollow space extending along a longitudinal direction thereof is used, and a heater and a temperature sensor for a temperature control are built inside the iron tip main body (for example, refer to Japanese Patent Application, Publication No. 2004-17060). The soldering iron of such a configuration conventionally has a heater output of about 70 W to 150 W, for example.

On the contrary, in the soldering of automotive electric components for a vehicle, a soldering iron of a large output is used such as that of 300 W to 500 W, for example. Such a soldering iron of the large output has high temperature of a heater, and the temperature reaches about 1000 degree Celsius at a center of the heater.

For the temperature sensor of a soldering iron, normally a thermos couple is used, being wired so as to penetrate a center of the heater. For one example, as far as a temperature sensor of a general strand diameter of 0.65 is concerned, heat resistance temperature for normal use is about 650 to 850 degree Celsius. Therefore, for such a soldering iron of the large output, there is a possibility that the temperature sensor goes beyond the resistance temperature by the heat of the heater wire, and such a high heat causes a breaking wire of the temperature sensor in a short time.

In addition, as far as a lead wire of the temperature sensor is wired so as to penetrate the center of the heater like a conventional soldering iron, there is a possibility that accurate temperature measurement is interfered with a noise applied to the temperature sensor when a current is applied to the heater of the large output.

SUMMARY

An aspect of the present invention provides a soldering iron in which deterioration of the temperature sensor by the heat and a measurement inaccuracy of the temperature sensor by the noise of the heater even for a soldering iron using a heater of a large output is reduced, and a large output, a long life and an accurate temperature measurement at iron tip are enabled.

A soldering iron of the aspect of the present invention is a soldering iron including an iron main body; and an iron tip having a leading end configured to fuse solder, the iron tip including an iron tip main body of a thermal conductive material; a heater configured to heat the iron tip main body, and a temperature sensor configured to detect a temperature of the leading end side of the iron tip, wherein, a first hole part accommodating the heater and a second hole part accommodating the temperature sensor are formed independent of each other inside the iron tip main body.

According to the soldering iron of an embodiment, the first hole part accommodating the heater and the second hole part accommodating the temperature sensor are formed independent of each other inside the iron tip main body. In this way, it is possible to prevent the heat generated by the heater from directly propagating to the lead wire of the temperature sensor.

In other words, there is a possibility of accelerated deterioration or breaking wire due to that the temperature sensor is exposed to high heat in the conventional soldering iron in which the lead wire of the temperature sensor is directly exposed to the heater.

On the contrary, by forming the first hole part accommodating the heater and the second hole part accommodating the temperature sensor independent of each other inside the iron tip main body, it is possible to prevent the heat generated by the heater from directly propagating to the lead wire of the temperature sensor, and to reduce the accelerated deterioration by heat or the breaking wire of the temperature sensor. Especially, when a heater wire of large output is used, it is possible to enable a soldering iron of long life and large output in a simple configuration by effectively preventing over heating of the temperature sensor.

In the soldering iron, the first hole part may be formed in a center area of a cross section orthogonal to a longitudinal direction of the iron tip main body, and the second hole part may be formed in a peripheral area around the first hole part.

In the soldering iron, the heater may have an output equal to or greater than 200 W.

In the soldering iron, an insulation part may be formed in the first hole part and the second hole part.

According to the aspect of the present invention, it is possible to provide a soldering iron in which deterioration of the temperature sensor even for a soldering iron using a heater of a large output is reduced, and a large output and a long life are enabled.

BRIEF DESCRIPTION OF THE REFERENCE NUMERALS

10 SOLDERING IRON
11 IRON TIP
12 IRON MAIN BODY
21 IRON TIP MAIN BODY
22 HEATING DEVICE
28 EXTERIOR TUBE
31 INSULATOR TUBE
32 HEATER WIRE

33 TEMPERATURE SENSOR
35A FIRST HOLE PART
35B SECOND HOLE PART

DESCRIPTION OF THE EMBODIMENTS

Hereinafter, a soldering iron according to embodiments of the aspect of the present invention is described with reference to the drawings. Description of specific embodiment below is made for better understanding of the aspect of the present invention, thus, does not limit the present invention, unless otherwise specified. There may be cases in which the drawings referred to in the description below shows magnified image of important portion for the purpose of convenience in terms of explaining features of the aspect of the present invention. Therefore, dimension ratio or the like of each elements are not always the same as actual elements.

Below, a soldering iron according to an embodiment of the aspect of the present invention is described.

Figure 1:
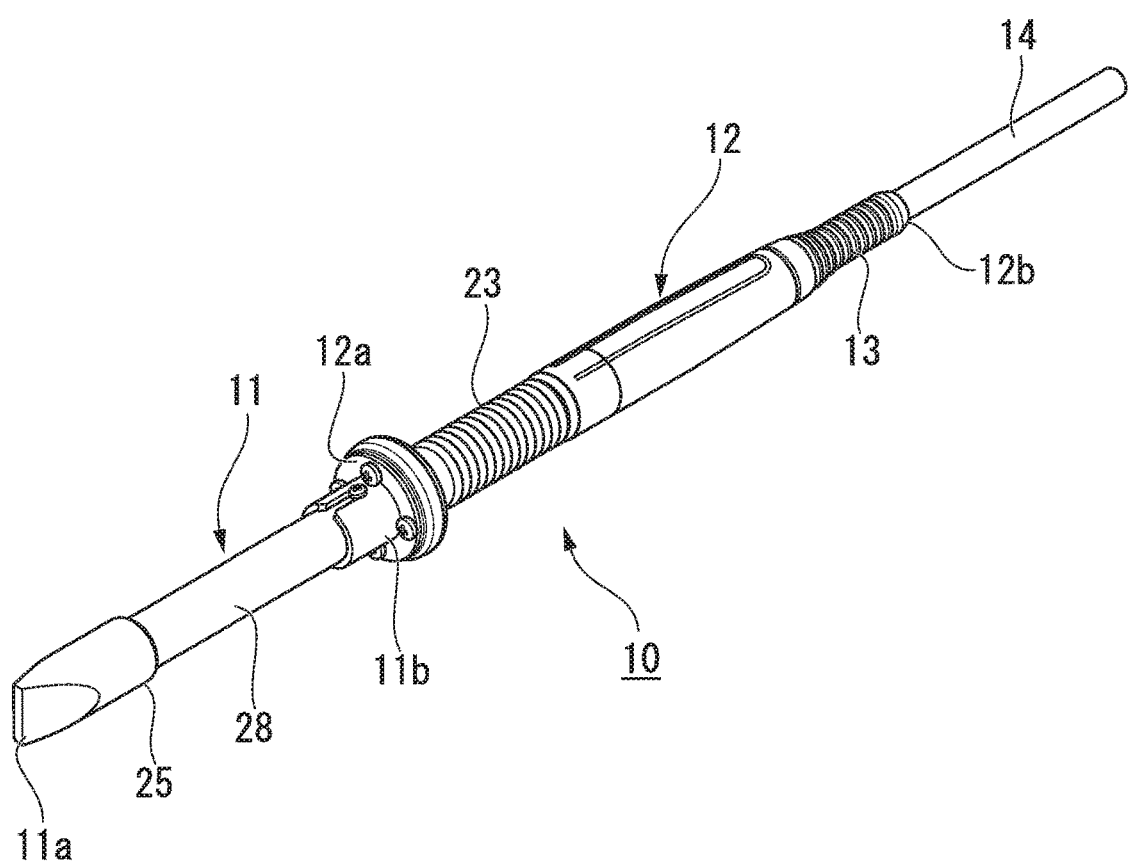
FIG. 1 is an external perspective view of a soldering iron according to an embodiment of the aspect of the present invention.
Figure 2:
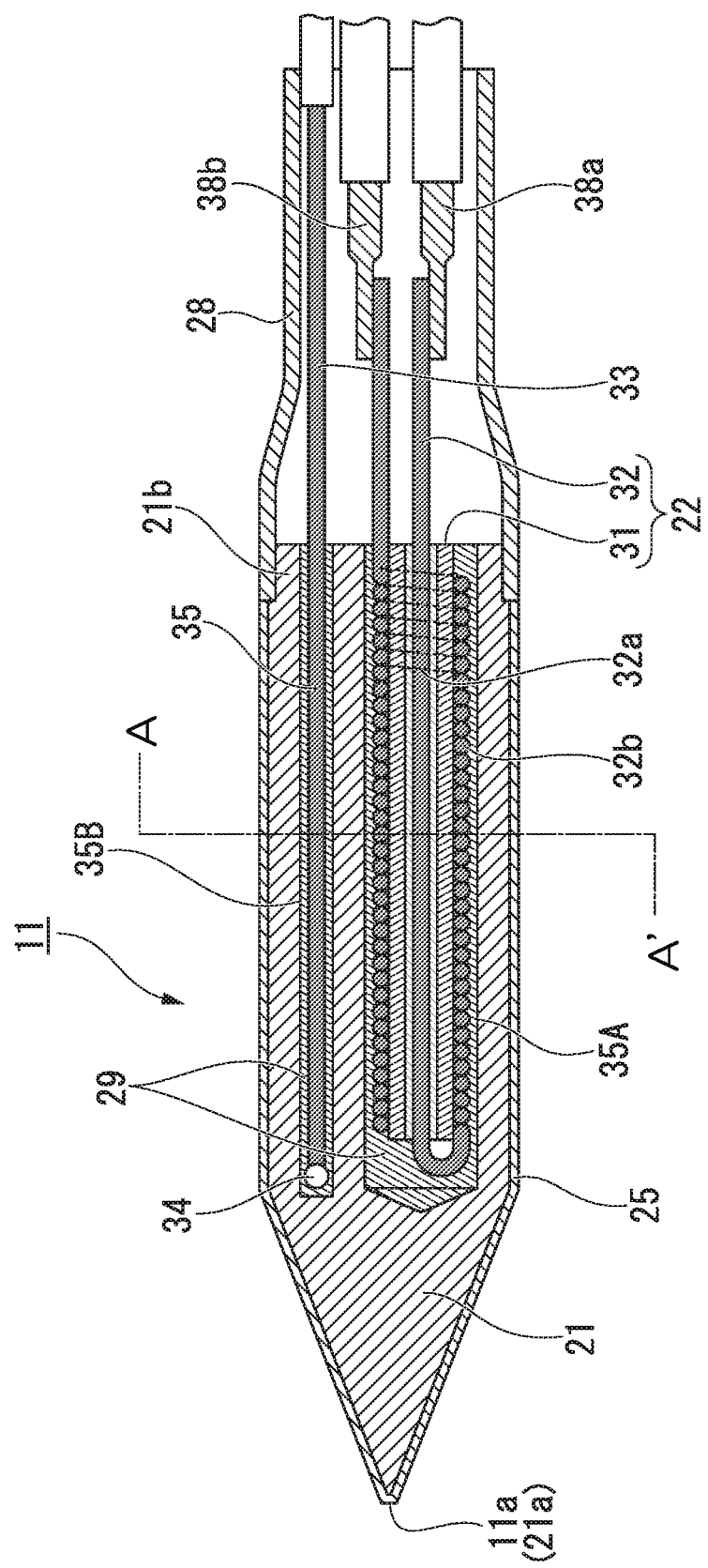
FIG. 2 is a cross sectional view showing an iron tip.
Figure 3:
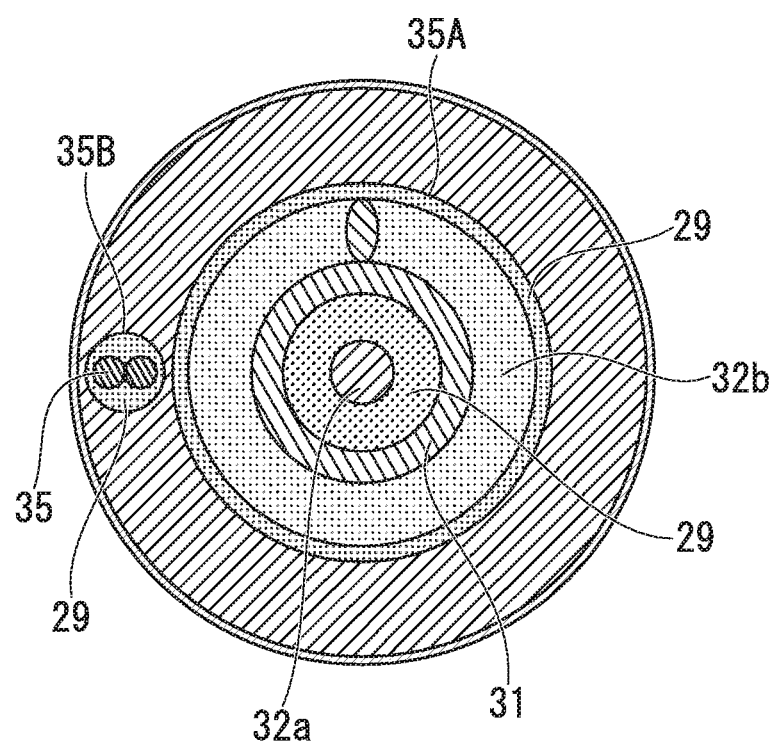
FIG. 3 is a cross sectional view seen along the line A-A' in FIG. 2.

FIG. 1 is an external perspective view of a soldering iron according to a first embodiment of the aspect of the present invention. FIG. 2 is a cross sectional view showing an iron tip. FIG. 3 is a cross sectional view seen along the line A-A' in FIG. 2.

A soldering iron 10 is used for such purposes as fusing (melting) solder which is low melting point alloy at leading end part 11a of the soldering iron 10, soldering and removing solder which is applied. The soldering iron 10 includes an iron tip 11 configured to fuse solder with a leading end 11a and an iron main body 12 provided integrally with the iron tip 11 at a base end 11b side of the iron tip 11. A grip part 23 is formed at the iron main body 12.

At a base end 12b of the iron main body 12, a cord armor 13 formed of rubber is attached. In the cord armor 13, a cord 14 is formed to penetrate therein, which is connectable to power source. In the description hereinafter, simply describing "leading end" refers to an end of the member being referred to in the direction towards the leading end 11a of the iron tip 11, and simply describing "base end" refers to an end of the member being referred to in the direction towards the base end 12b of the iron main body 12.

As shown in FIG. 2, the iron tip 11, in a major way, includes an iron tip main body 21, a heating device 22 built in the iron tip main body 21 and at a base end 21b at an opposite side to a leading end 21a of the iron tip main body 21, an exterior tube 28 is connected. The exterior tube 28 is made with SUS tube, for example.

The iron tip main body 21 is made with a material with high heat conductivity, for example, copper. Also, a plating layer 25 is formed on the outer surface of the iron tip main body 21. A leading end portion of the tip main body 21 is made to be a leading end 11a of the iron tip 11. The iron tip 11 of the present embodiment has a wedge shape with linear leading end portion. Additionally, shape of the iron tip as above may be any shapes in accordance with a shape of a soldering joint portion such as a cone shape with sharp end portion. Inside the iron tip main body 21 as described above, the heating device 22 and the temperature sensor 33 are accommodated.

Additionally, the iron tip main body 21 is formed with copper, and the plating layer 25 formed with iron plating is formed therearound in the present embodiment. However, configuration material of iron tip main body 21 or of the plating layer 25 is not limited thereto, as long as it is formed with material of high heat conductivity.

The heating device 22 has an insulator tube 31 of insulator material for example ceramics and a heater wire 32 (a heater) configured to heat the iron tip main body 21. The heater wire 32 includes an outward route part 32a extending towards the leading end of the iron tip 11a and also includes a return route part 32b extending towards the base end of the iron tip 11b, configured by folding back the outward route part 32a at a vicinity of the leading end 11a of the iron tip 11. Instead of the outward route part 32a, it is also possible to configure to extend an electrical power wire 38a described below so as to penetrate in the center portion of the heater to join the return route part 32b at the vicinity of the leading end 11a.

The outward route part 32a and the return route part 32b of the heater wire 32 (the heater) include a continuous heating wire. As examples of the heating wire, there are iron-chromium alloy containing aluminum, tungsten line, nichrome wire or the like. Additionally, the heater wire 32 of the present embodiment is of a large output heater with an output of 200 W to 1000 W.

The outward route part 32a of the heater wire 32 extends from a base end 21b side via a heater wire hole 41 formed in a center of the insulator tube 31 towards a leading end 21a side. And the return route part 32b of the heater wire 32 is connected to the outward route part 32a at the leading end 21a side and extends from the leading end 21a side towards the base end 21b side, while being wound around an outer circumferential surface of the insulator tube 31 like a coil.

The outward route part 32a and the return route part 32b of the heater wire 32 are respectively connected to an electrical power wire 38a and an electrical power wire 38b via a contact piece 37a and a contact piece 37b at a side of the base end 21b of the iron tip main body 21. In this way, the heater wire 32 generates heat, being supplied power from the electrical power wire 38a and the electrical power wire 38b, and thus possible to heat the leading end 11a of the iron tip 11 via the filling member 29.

In addition, the heater wire 32 can be covered with an oxide film, for example, by burning a surface in order to enhance insulation quality. In this way, it is possible to enhance the layout density by disposing the heater wire closer with each other. Therefore, it is possible to use even smaller iron tip, which enhances heat efficiency due to higher density of the heater wires.

The temperature sensor 33 includes a temperature detection part 34 disposed at a side of a leading end 11a of an iron tip 11 and a sensor wire 35 (a lead wire) extending from the temperature detection part 34. The temperature detection part 34 is disposed at a leading end side of the heating device 22. For example, K type thermocouple such as an alumel-chromel joined body, E type thermocouples such as a chromel-constantan joined body, J type thermocouples such as an iron-constantan joined body and those sensors that function equally as thermocouples can be used as the temperature detection part 34.

By forming the temperature detection part 34 of the temperature sensor 33 in a vicinity of the leading end 11a of the iron tip 11, it is possible to detect the temperature of the iron tip 11 even more accurately. In case where temperature sensor is configured in serial or parallel, the temperature detection part 34 is configured not to abut with the iron tip 11.

Inside the iron tip main body 21, a first hole part 35A which is a closed tube extending from the base end 21b side towards the leading end 21a side and a second hole part 35B are formed. The first hole part 35A is formed in a center area in a cross section (refer to FIG. 3) orthogonal to a longitudinal direction of the iron tip main body 21. And the second hole part 35B is formed in a peripheral area which is outside of the first hole part 35A.

Inside the first hole part 35A, the heater wire (heater) 32 formed with the outward route part 32a and the return route part 32b as well as an insulator tube 31, around an outer circumferential surface of which the return route part 32b of the heater wire 32 is wound are accommodated. And inside the second hole part 35B, a temperature sensor 33 formed with a temperature detection part 34 and a sensor wire (the lead wire) 35 is accommodated. The first hole part 35A and the second hole part 35B are formed independent of each other in the iron tip main body 21, and are thermally separated.

Additionally, in a gap between an inner surface of the first hole part 35A and the heater wire (heater) 32 and in a gap between an inner surface of the second hole part 35B and the temperature sensor 33, insulator parts 29 are respectively formed by filling the insulator material. As the insulator material to constitute the insulator part 29, it is possible to use such insulator material as ceramics which is excellent in heat conductivity.

Hereinafter, functions and effects of the soldering iron 10 of the above configuration will be described. In the soldering iron 10 of the present embodiment, the first hole part 35A accommodating the heater 32 and the second hole part 35B accommodating the temperature sensor 33 are formed independent of each other. In this way, it is possible to prevent the heat generated by the heater wire 32 from directly propagating to the temperature sensor 33.

In other words, there is a possibility of accelerated deterioration or breaking wire due to that the temperature sensor is exposed to high heat in the conventional soldering iron in which the lead wire of the temperature sensor is directly exposed to the heater such a way as wiring a sensor wire (the lead wire) of the temperature sensor in the center of the heater wire wound around like a coil.

On the contrary, by forming the first hole part 35A and the second hole part 35B independent of each other and accommodating the heater wire 32 and the temperature sensor 33 respectively in the first hole part 35A and the second hole part 35B, it is possible to prevent the heat generated by the heater wire 32 from directly propagating to the temperature sensor 33, and to reduce the deterioration by heat or the breaking wire of the temperature sensor 33. Especially, when a heater wire 32 of large output over 200 W is used, it is possible to enable a soldering iron 10 of long life and large output in the simple configuration by effectively preventing over heating of the temperature sensor 33.

Additionally, by accommodating the heater wire 32 and the temperature sensor 33 in the first hole part 35A and the second hole part 35B respectively, the heater wire 32 and the temperature sensor 33 are separated. Thus, when a current is applied to the heater wire 32 of the large output, it is possible to prevent the heat generated by the heater wire 32 from directly propagating to the temperature sensor 33, and to securely prevent the deterioration of the measurement inaccuracy of the temperature sensor 33.

In addition, a coil heater in which the heater wire being wound like a coil is introduced as an example of the heater to heat the iron tip in the present embodiment, however, configuration of a heater is not limited thereto.

Figure 4A:
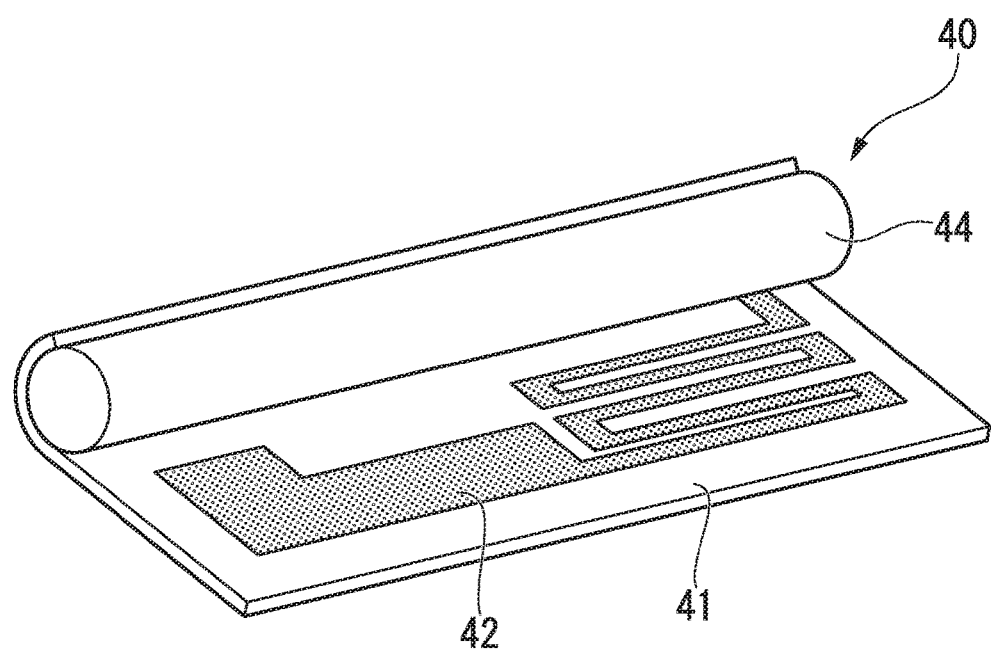
FIG. 4A is a perspective view for explaining another example of a heater.
Figure 4B:
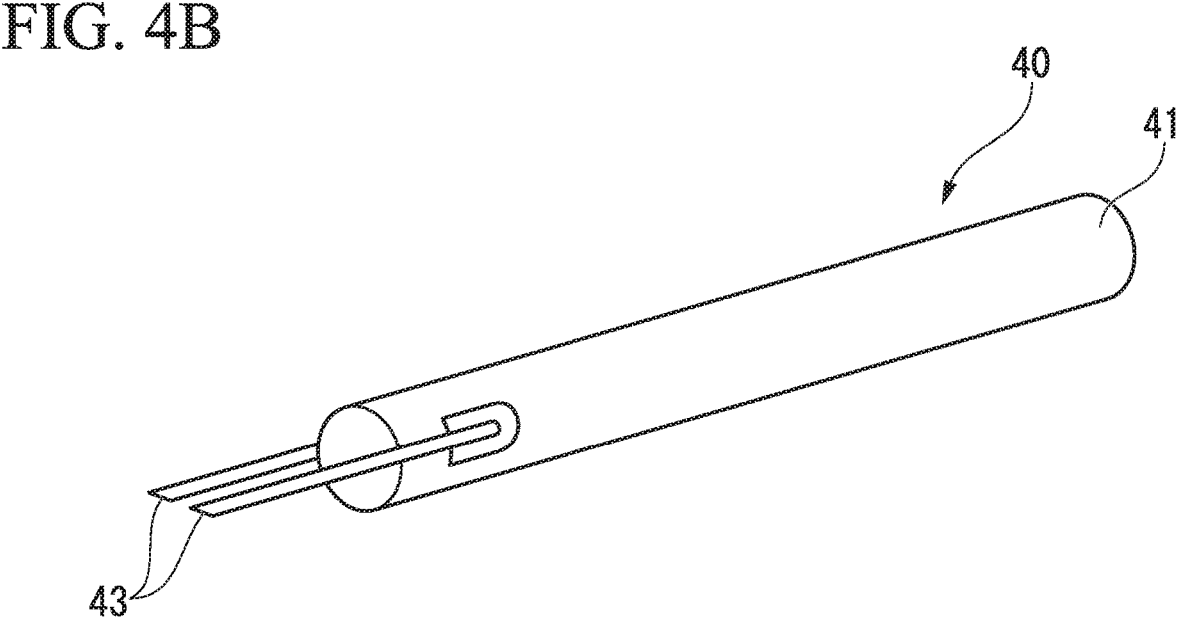
FIG. 4B is a perspective view for explaining another example of a heater.

FIG. 4A and FIG. 4B are perspective views for explaining another example of a heater. As shown in FIG. 4A, the heater 40 is a ceramics heater in which a heat generation body 42 of a thin film in a predetermined pattern is formed on a sheet like base material 41 of ceramics which is excellent in heat conductivity, for example, alumina. As shown in FIG. 4B, the heater 40 is formed by winding the base material 41 around a heater main body 44 like a rod and being burned, then being provided with connection terminals 43.

It is possible to insert the heater 40 as described above as a heating device in the first hole part 35 formed in the iron tip main body 21 of the above embodiment. The heater 40 as described above (a ceramics heater) is excellent in reliability and capable of heating an iron tip effectively.

The embodiments of the aspect of the present invention is described above, however, the embodiments are presented for exemplary purpose, and not intended to limit the scope of the invention. It is possible to work the embodiments in other variety of modes, and possible to conduct various omission, replacement and changes without departing from the scope of the invention. The embodiments and its modifications fall within the scope and the main point of the invention, and also fall within the scope of the claimed inventions and its equivalents.

Other than above embodiments, the soldering iron described above may be applicable to, for example, soldering tweezers (a soldering iron) for putting on and off of electrical components, which are provided with two openable iron tips from each other. In this way, it is possible to realize soldering tweezers for putting on and off electrical components, which are possible to grasp and remove tiny electrical components. In addition, the soldering iron described above may be applicable to a heating tool (an iron) for heat joining between the solid objects in a heat caulking machine (fusing machine).

The invention claimed is:
1. A soldering iron comprising:
an iron main body; and
an iron tip having a leading end configured to fuse solder, the iron tip comprising:
an iron tip main body of a thermal conductive material, the iron tip main body having a longitudinal axis;
a heater configured to heat the iron tip main body, and
a temperature sensor configured to detect a temperature of the iron tip,
wherein the iron tip main body has a first hole and a second hole that are separate in a lateral direction orthogonal to the longitudinal axis and distinct from each other,
the heater is accommodated in the first hole,
the temperature sensor is accommodated in the second hole,
a wall of the thermal conductive material provided extending along the longitudinal axis and is disposed between the first hole and the second hole in the lateral direction, the wall having first and second faces facing opposite each other and a wall body sandwiched between the first face and the second face in the lateral direction, the first face extending along the longitudinal axis and facing the first hole in the lateral direction, the second face extending along the longitudinal axis and facing the second hole in the lateral direction, the first and second holes having, respectively, first and second center axes along the longitudinal axis, the wall body being disposed between the first center axis and the second center axis in the lateral direction, and
an insulator material is disposed between the heater and the wall and is disposed between the temperature sensor and the wall.
2. The soldering iron according to claim 1, wherein the first hole is formed in a center area of a cross section orthogonal to the longitudinal axis of the iron tip main body, and the second hole is formed in a peripheral area around the first hole.

3. The soldering iron according to claim 1 or 2, wherein the heater has an output equal to or greater than 200 W.

4. The soldering iron according to claim 1 or 2, wherein the heater has an output of 300 W to 1000 W.

5. A soldering iron comprising:
an iron main body; and
an iron tip having a leading end configured to fuse solder, the iron tip comprising:
an iron tip main body of a thermal conductive material, the iron tip main body having a longitudinal axis;
a heater configured to heat the iron tip main body, and
a temperature sensor configured to detect a temperature of the iron tip,
wherein the iron tip main body has a first hole and a second hole that are separate in a lateral direction orthogonal to the longitudinal axis and distinct from each other,
the heater is accommodated in the first hole,
the temperature sensor is accommodated in the second hole,
a wall of the thermal conductive material provided extending along the longitudinal axis and disposed between the first hole and the second hole in the lateral direction, the wall having first and second faces facing opposite each other and a wall body sandwiched between the first face and the second face in the lateral direction, the first face extending along the longitudinal axis and facing the first hole in the lateral direction, the second face extending along the longitudinal axis and facing the second hole in the lateral direction, the first and second holes having, respectively, first and second center axes along the longitudinal axis, the wall body being disposed between the first center axis and the second center axis in the lateral direction, and
an insulator material is filled in the first hole and the second hole.

* * * * *

UNITED STATES PATENT AND TRADEMARK OFFICE
CERTIFICATE OF CORRECTION

| | | |
|---|---|---|
| PATENT NO. | : 10,722,963 B2 | Page 1 of 1 |
| APPLICATION NO. | : 15/408467 | |
| DATED | : July 28, 2020 | |
| INVENTOR(S) | : Tomohiro Shigekawa et al. | |

It is certified that error appears in the above-identified patent and that said Letters Patent is hereby corrected as shown below:

On the Title Page

Item (*), delete "This patent is subject to a terminal disclaimer."

Signed and Sealed this
Tenth Day of November, 2020

Andrei Iancu
*Director of the United States Patent and Trademark Office*